Patented Oct. 11, 1932

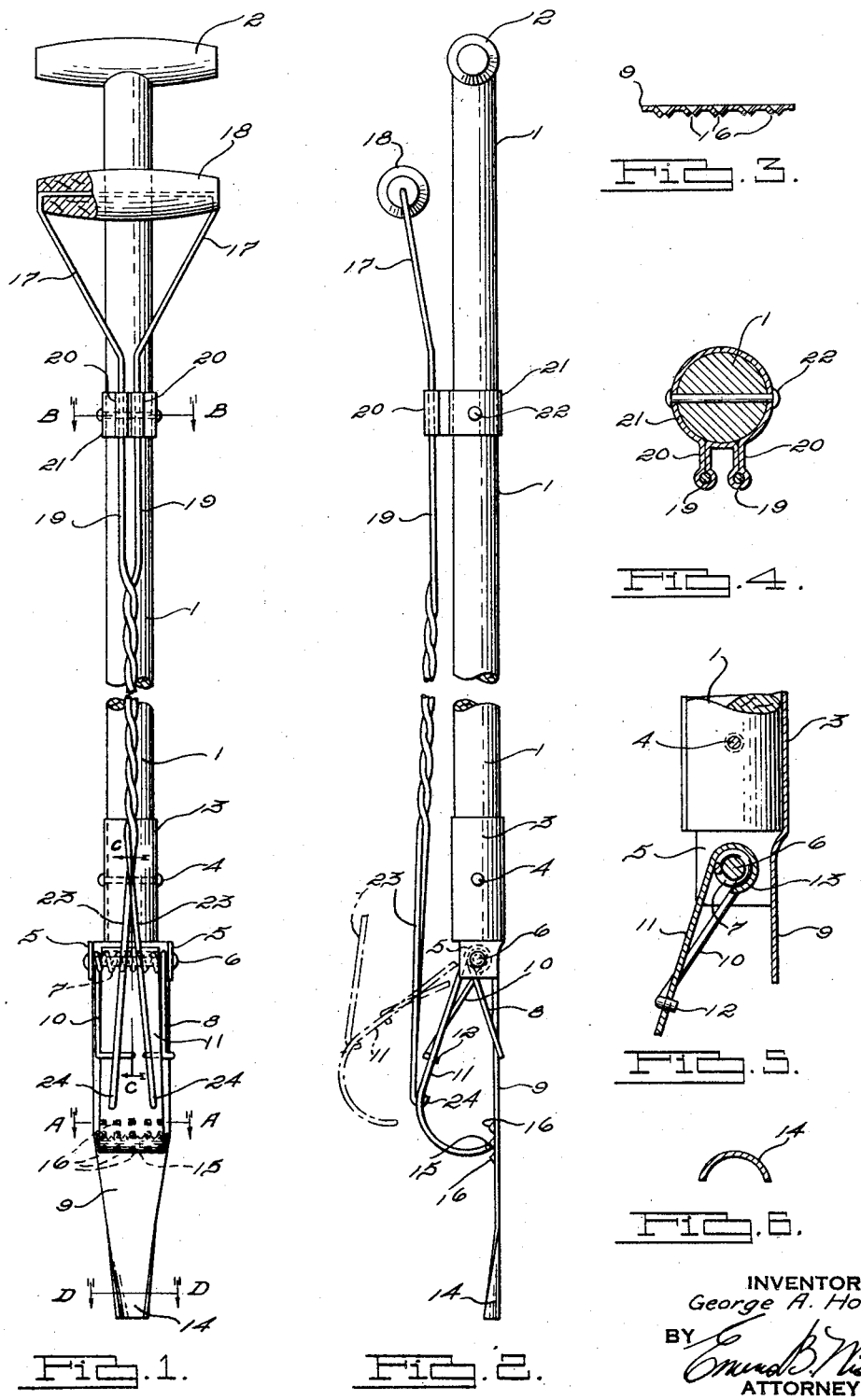

1,882,423

UNITED STATES PATENT OFFICE

GEORGE A. HOLZ, OF DETROIT, MICHIGAN

LAWN WEEDER

Application filed October 27, 1931. Serial No. 571,370.

This invention relates to lawn weeders and the object of the invention is to provide a lawn weeder having a spade and a gripping jaw associated therewith and arranged so that the gripping jaw may be raised against a spring tension and released to engage a weed between the gripping jaw and spade whereby the weed may be withdrawn from the lawn.

Another object of the invention is to provide a lawn weeder which may be operated with one hand.

Another object of the invention is to provide a lawn weeder having a pair of lugs or brackets on which the gripping jaw is pivotally mounted, a spring being provided at the pivot point normally urging the gripping jaw into engagement with the spade and release means being provided whereby the gripping jaw may be lifted out of engagement with the spade against the tension of the spring.

Another object of the invention is to provide a pivot pin about which the spring is positioned and the gripping jaw being provided with an end extending about the spring whereby the gripping jaw is pivotally mounted on the spring and the spring is connected to urge the gripping jaw into engagement with the spade.

These objects and the several novel features of the invention are herinafter more fully described and claimed and the preferred form of construction by which these objects are attained is shown in the accompanying drawing in which—

Fig. 1 is a front elevation of a lawn weeder embodying my invention.

Fig. 2 is a side elevation thereof.

Fig. 3 is an enlarged section taken on line A—A of Fig. 1.

Fig. 4 is an enlarged section taken on line B—B of Fig. 1.

Fig. 5 is an enlarged section taken on line C—C of Fig. 1.

Fig. 6 is an enlarged section taken on line D—D of Fig. 1.

The device comprises a wood handle 1 having a wood cross-piece 2 at the upper end providing a hand hold. At the lower end the handle 1 is secured in a sheet metal socket 3 by means of the rivet 4 and the sheet metal is bent to provide lugs 5 on opposite sides beneath the handle. These lugs 5 support a rivet or bolt 6 and a coiled spring 7 is positioned about the bolt 6 and is provided with an end 8 which engages behind the spade 9 as shown in Fig. 2. The other end 10 of the spring 7 extends across the top of the gripping jaw 11 and is provided with a downturned end 12 engaging in an aperture provided therefor in the gripping jaw 11. The end of this gripping jaw extends between the lugs 5 and is provided with a curved end 13 which extends about the coiled spring 7 so that the gripping jaw is pivotally mounted on this coiled spring. The spade 9 is flat through most of its length but at the lower edge is provided with a curved portion 14 shown in Figs. 1, 2 and 6. The edge of the gripping jaw 11 is notched to provide teeth 15 and the spade is provided with struck-up points 16, shown in Figs. 1, 2 and 3, adjacent the edge of the gripping jaw so that weeds may be readily gripped between the teeth 15 of the gripping jaw and the points 16 of the spade and will be firmly held thereby in order to pull the weed out by the roots. A wire rod 17 is provided extending through a hand hold 18 shown at the top of Figs. 1 and 2. The wire rod 17 extends at an angle from each end of the hand hold and is provided with two parallel portions 19.

These parallel portions as shown in Figs. 1, 2 and 4 extend through guides 20 provided therefor on a bracket 21 which is secured to the handle 1 by means of a rivet 22. In assembling the guide on the wire rods, the ends of the bracket are opened out to spread the guides apart and allow the rods 19 to be inserted to position, at which time, the ends of the bracket are positioned about the handle 1 and are secured in place by the rivet 22. The two portions 19 of the wire rod are then twisted as shown in the lower portion of Figs. 1 and 2 and from this twisted portion the two ends 23 extend outwardly and are provided with hook ends 24 which are engaged in apertures provided therefor in the gripping jaw 11.

In operation the palm of the hand may be positioned on the hand hold 2 with the fingers engaging about the hand hold 18. By gripping the hand holds in this manner the hand hold 18 may be raised upwardly to raise the gripping jaw 11 to the dotted position shown in Fig. 2. It will be noted that the twisted portion of the wire rod will limit upward movement of the hand hold 18 when the twisted portion engages the bracket 21. When the jaw 11 is raised the spade may be pushed into the soil beside a weed and due to the curved lower edge 14, the handle 1 and spade may be turned on their vertical axes to cut through the earth around the weed. At this time the hand hold 18 may be released and the spring 7 will throw the gripping jaw 11 inwardly to engage the weed between the toothed edge 15 of the gripping jaw and the points 16 on the spade 9. At this time the device may be lifted to pull the weed up by the roots and the weed will be held in the weeder until the handle 18 is again lifted to release the gripping jaw and drop the weed.

It will be noted with this device that the entire operation may be accomplished with one hand so that the device is much easier to operate than the usual types of lawn weeders and the spring 7 is arranged so as to hold the weed between the gripping jaw and spade until released. It will also be noted that the gripping jaw at its point of contact with the spade 9 curves upwardly slightly so that once the weed is engaged between the jaw and spade it is firmly held and cannot readily be pulled out.

From the foregoing description, it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a lawn weeder, a handle, a spade secured to the lower end of the handle, a pair of lugs extending from the spade, a pivot pin supported by the lugs, a coiled spring about the pivot pin, a gripping jaw pivotally mounted on the coiled spring, one end of the spring engaging the spade and the other end engaging the gripping jaw to normally urge the gripping jaw into engagement with the spade, a hand hold for raising the gripping jaw, a wire rod extending through the hand hold and having two parallel portions, a bracket secured to the handle, the parallel portions of the wire rod being slidably mounted in the bracket and the lower ends of the wire rod being connected with the gripping jaw whereby upward movement of the wire rod will raise the gripping jaw against the tension of the spring.

2. In a lawn weeder, a handle, a sheet metal spade secured to the lower end of the handle and having a pair of lugs extending therefrom, a pivot pin mounted in the lugs, a coiled spring about the pivot pin between the lugs, a gripping jaw mounted to turn on the coiled spring and having a toothed edge for engagement with the spade, the spade having struck-up points adapted to be engaged by the edge of the gripping jaw and the ends of the spring being connected to the spade and gripping jaw to urge the gripping jaw towards the spade, a bracket on the handle, a wire rod slidably mounted in the bracket and having a hand hold adjacent the upper end of the handle, the wire rod being connected with the gripping jaw whereby the gripping jaw may be turned away from the spade against the tension of the spring.

3. In a lawn weeder, a handle, a spade secured to the lower end of the handle, a pair of lugs extending from the spade at the lower end of the handle, a pivot pin extending between the lugs, a spring positioned about the pivot pin, a gripping jaw pivotally mounted on the spring, one end of the spring engaging behind the spade and the other end of the spring engaging over the gripping jaw to normally urge the gripping jaw into engagement with the spade, a wire rod connected to the gripping jaw and having a hand hold terminating adjacent the upper end of the handle whereby the gripping jaw may be turned upwardly on its pivot against the tension of said spring.

In testimony whereof I sign this specification.

GEORGE A. HOLZ.